(12) United States Patent
Zhou

(10) Patent No.: US 8,699,217 B2
(45) Date of Patent: Apr. 15, 2014

(54) FIXING DEVICE FOR USE WITH EXPANSION CARDS IN A COMPUTER

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 151 days.

(21) Appl. No.: 13/279,345

(22) Filed: Oct. 24, 2011

(65) Prior Publication Data

US 2013/0048814 A1   Feb. 28, 2013

(30) Foreign Application Priority Data

Aug. 25, 2011  (CN) .......................... 2011 1 0246235

(51) Int. Cl.
*G06F 1/16* (2006.01)
*H05K 5/00* (2006.01)
*H05K 7/00* (2006.01)

(52) U.S. Cl.
USPC .............. 361/679.31; 361/679.32; 361/679.4; 248/221.11; 248/222.11; 248/222.12; 248/222.52; 248/223.41; 248/225.11; 248/225.21

(58) Field of Classification Search
USPC ............... 361/679.31, 679.32, 679.4, 679.58; 248/220.21, 221.11, 222.11, 222.12, 248/222.13, 222.52, 223.41, 225.11, 225.21
See application file for complete search history.

(56) References Cited

U.S. PATENT DOCUMENTS

| | | | | |
|---|---|---|---|---|
| 4,313,150 A * | 1/1982 | Chu | | 361/755 |
| 4,745,524 A * | 5/1988 | Patton, III | | 361/679.32 |
| 5,140,501 A * | 8/1992 | Takahashi et al. | | 361/798 |
| 5,389,000 A * | 2/1995 | DiViesti et al. | | 439/157 |
| 5,741,055 A * | 4/1998 | Chen | | 312/348.6 |
| 5,946,196 A * | 8/1999 | Baek | | 361/798 |
| 6,738,261 B2 * | 5/2004 | Vier et al. | | 361/740 |
| 7,944,687 B2 * | 5/2011 | Walker et al. | | 361/679.37 |
| 8,174,835 B2 * | 5/2012 | Kim et al. | | 361/737 |
| 8,218,315 B2 * | 7/2012 | Lu | | 361/679.58 |
| 8,534,637 B2 * | 9/2013 | Kuo | | 248/500 |
| 2007/0053149 A1 * | 3/2007 | Guo et al. | | 361/685 |
| 2009/0231798 A1 * | 9/2009 | Skinner | | 361/679.31 |
| 2011/0013352 A1 * | 1/2011 | Chuang | | 361/679.31 |
| 2011/0032670 A1 * | 2/2011 | Tsai et al. | | 361/679.31 |
| 2011/0141680 A1 * | 6/2011 | Yang et al. | | 361/679.31 |
| 2011/0157821 A1 * | 6/2011 | Liu et al. | | 361/679.58 |

* cited by examiner

*Primary Examiner* — Terrell McKinnon
*Assistant Examiner* — Michael McDuffie
(74) *Attorney, Agent, or Firm* — Novak Druce Connolly Bove + Quigg LLP

(57) ABSTRACT

A fixing device for use with at least one expansion card in a computer chassis includes a positioning member and a fixing member. One side of the positioning member defines at least one first slot. The fixing member includes a fixing portion and a rotatable portion rotatablely connected to the fixing portion. The fixing portion defines at least one second slot corresponding to the at least one first slot. When the rotatable portion is able to rotate to a position where the at least one first slot face to the at least one second slot, allowing opposite sides of the free end of the at least one expansion card.

4 Claims, 4 Drawing Sheets

FIXING DEVICE FOR USE WITH EXPANSION CARDS IN A COMPUTER

BACKGROUND

1. Technical Field

The present disclosure relates to a device for fixing a number of expansion cards.

2. Description of Related Art

Expansion cards are often used in computers. First ends of expansion cards are generally fixed to a chassis, while second ends of the expansion cards are floating. As a result, when the expansion cards are long and are horizontally fixed to the chassis, the second ends of some of the expansion cards may droop to contact other expansion cards below, and a short circuit may occur.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
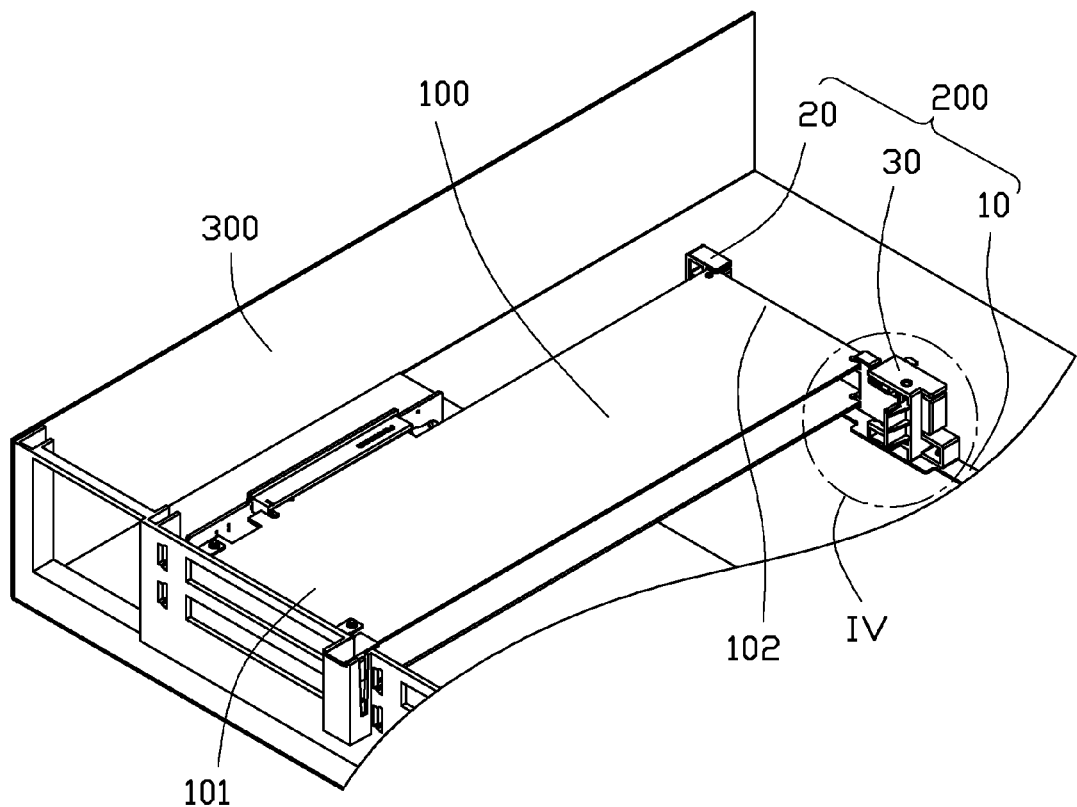
FIG. 1 is an assembled, isometric view of an exemplary embodiment of a fixing device in a computer chassis for use with expansion cards.
Figure 2:
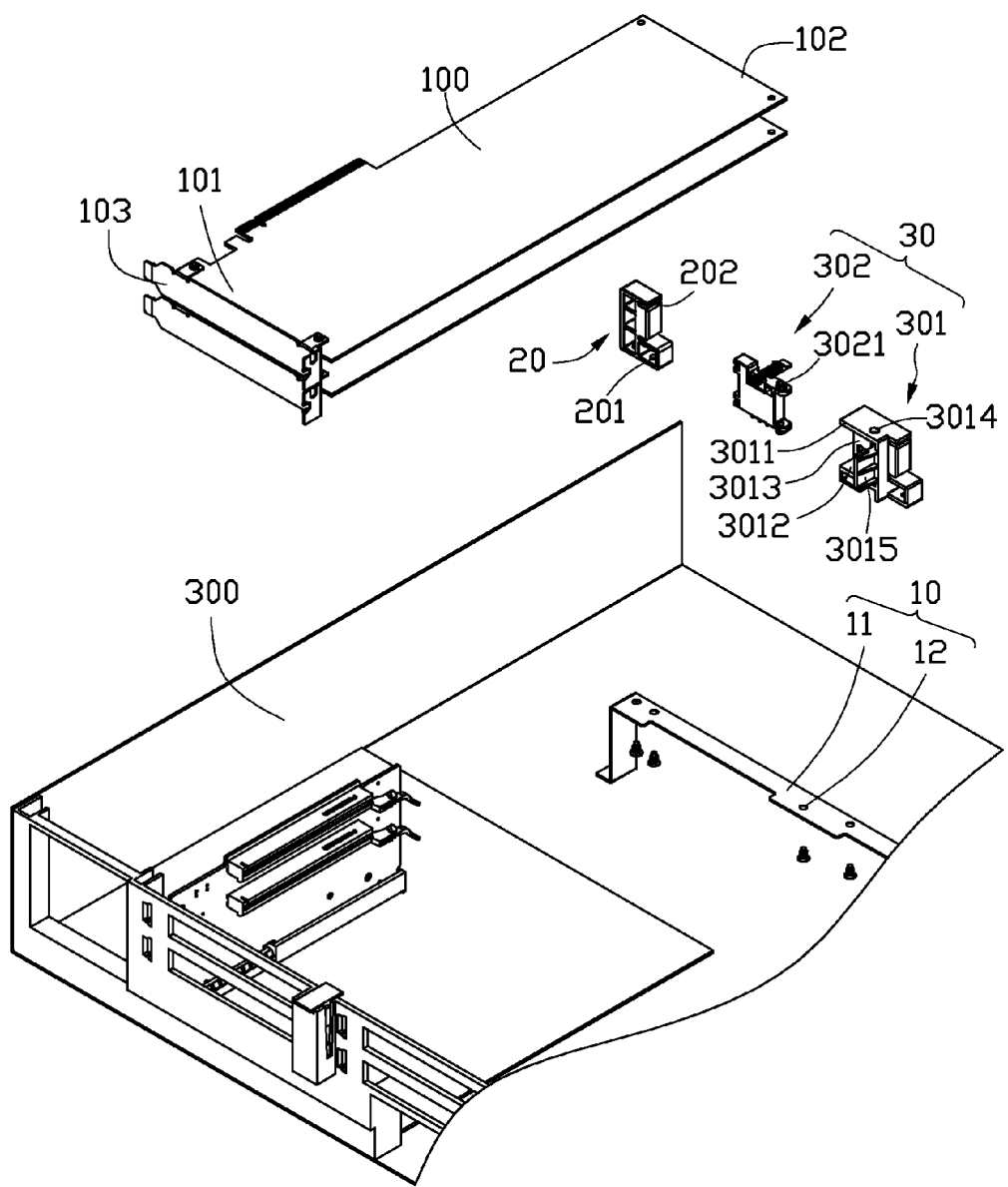
FIG. 2 is an exploded view of the fixing device and the computer chassis of FIG. 1.
Figure 3:
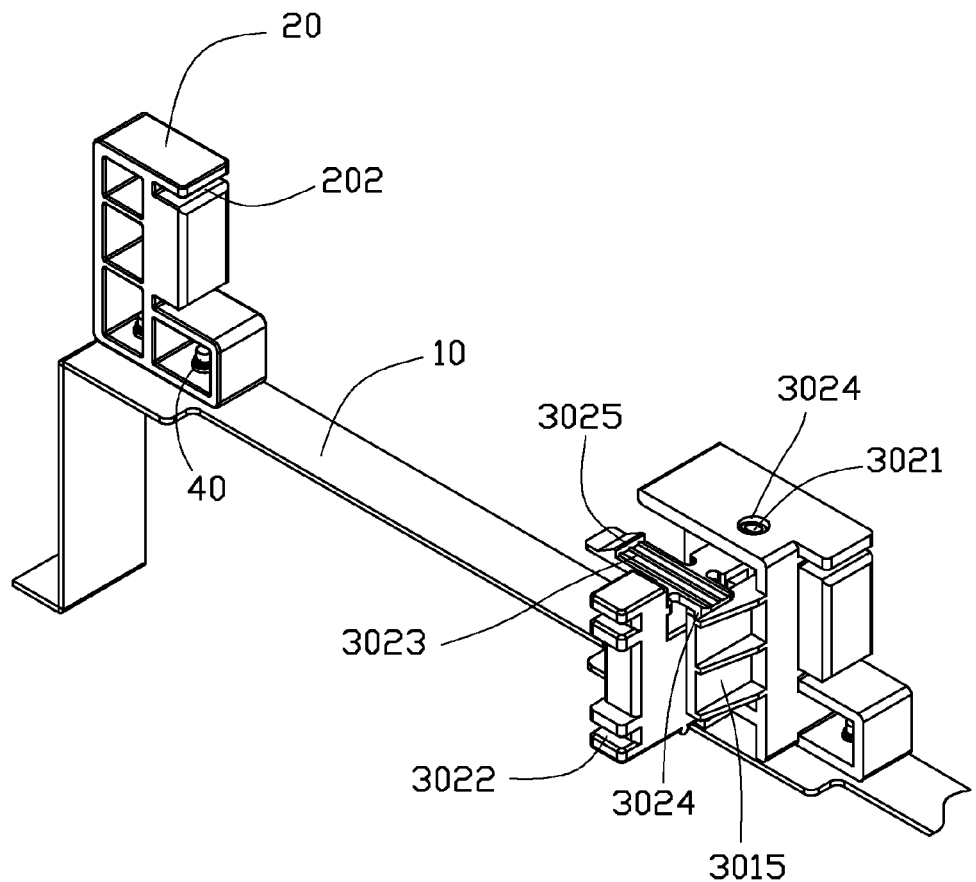
FIG. 3 is an assembled view of the fixing device of FIG. 1.

Referring to FIGS. 1-3, an exemplary embodiment of a fixing device 200 for use with at least one plate-shaped element 100 in a computer includes a support member 10, a position member 20, a fixing member 30, and a number of fasteners 40. In the embodiment, the plate-shaped element 100 is an expansion card 100 in a computer.

Each expansion card 100 includes a connection portion 103 extending from a first end 101 and mounted to a sidewall of a computer chassis 300. The fixing device 200 is configured to fix and support the free end 102 of the at least one expansion card 100.

The support member 10 includes a rectangular frame 11 and a number of through holes 12 defined in the top of the frame 11.

The position member 20 defines a number of fixing holes 201 in the bottom surface and at least one slot 202 in a sidewall to receive one side of the free end 102 of the at least one expansion card 100. The fixing holes 201 are respectively aligned with the through holes 12, and the fasteners 40 extend through the fixing holes 201 and the corresponding through holes 12 to fix the position member 20 to the frame 11.

The fixing member 30 is fixed to the top of the frame 11 by the fasteners 40. The fixing member 30 includes a fixing portion 301 and a rotatable portion 302 rotatably connected to the fixing portion 301. The fixing portion 301 includes a top surface 3011, a bottom surface 3012, and a supporting surface 3013 connecting the top surface 3011 and the bottom surface 3012. The top surface 3011 and the bottom surface 3012 both define a receiving hole 3014 aligned with each other. The fixing portion 301 further includes a stopper portion 3015 extending from the supporting surface 3013. A projection 3016 protrudes from the top of the stopper portion 3015.

Two posts 3021 extend from the opposite sides of the rotatable portion 302 and are respectively received in the receiving holes 3014 of the top surface 3011 and the bottom surface 3012. The rotatable portion 302 can rotate about the two posts 3021 relative to the fixing portion 301. The stopper portion 3015 can restrict range of rotation of the rotatable portion 302. The rotatable portion 302 defines at least one slot 3022. When the rotatable portion 302 rotates to the position where the at least one slot 3022 faces the at least one slot 202, the at least one slot 3022 and the at least one slot 202 can receive opposite sides of the free end 102 of the at least one expansion card 100, thereby fixing and supporting the free end 102.

The rotatable portion 302 further includes a locking member 3023. The locking member 3023 includes a first hook 3024 on the top surface adjacent to the stopper portion 3015 and a second hook 3025 on the bottom surface away from the stopper portion 3015. Referring to FIG. 3, in an initial state, the rotatable portion 302 resists the stopper portion 3015 and is latched by the first hook 3024 hooking the projection 3016.

Figure 4:
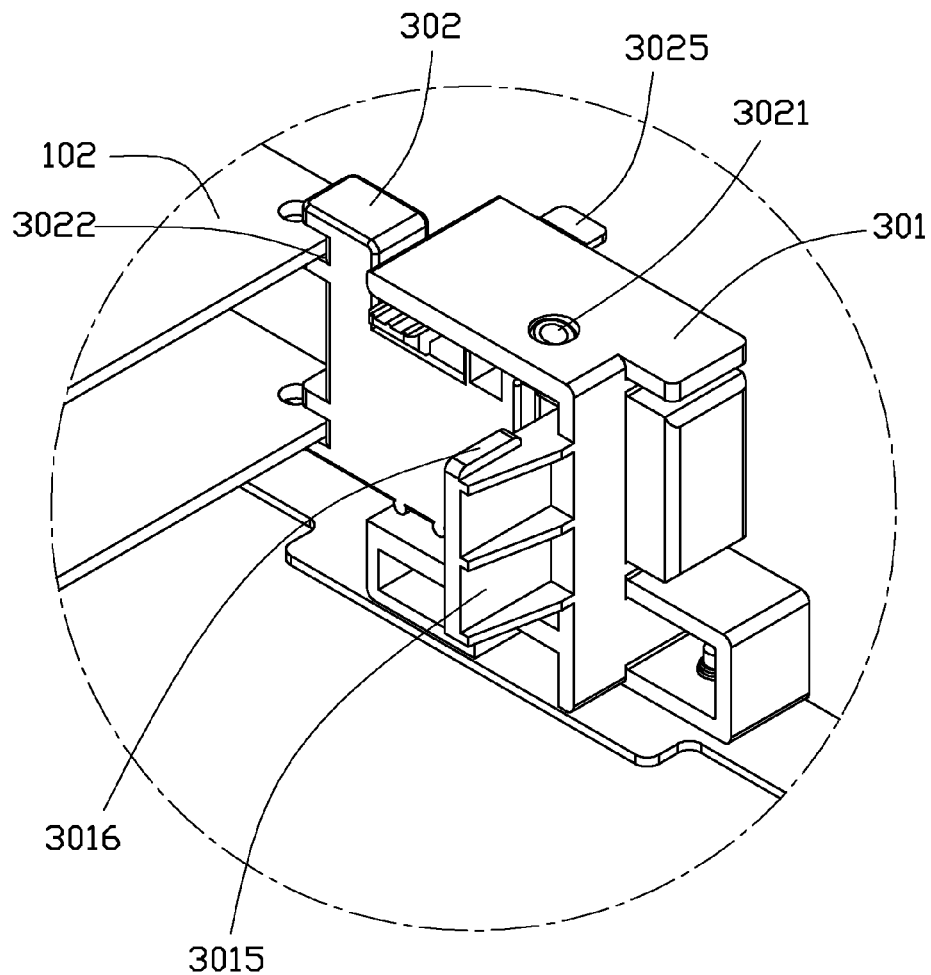
FIG. 4 is an enlarged view of a fixing member of the fixing device in FIG. 1.

Referring to FIG. 4, when the rotatable portion 302 rotates to a position where the slot 3022 faces the position member 20, the second hook 3025 hooks one side of the top surface 3011. In this embodiment, the locking member 3023 is flexible and can deflect when the rotatable portion 302 rotates to the above-mentioned position.

During assembly, the first end 101 of the at least one expansion card 100 is first connected to the chassis 300. One side of the free end 102 of the at least one expansion card 100 is caused to be received in the groove 202. The end of the locking member 3023 adjacent to the first hook 3024 is then pushed upward to release the rotatable portion 302. The rotatable portion 302 is then rotated to the position where the at least one slot 3022 faces the at least one slot 202, allowing another side of the free end 102 to be received in the slot 3022. In the above-mentioned position, the second hook 3025 hooks the rotatable portion 3011, which restricts the rotation of the rotatable portion 302.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A fixing device for use with at least one expansion card in a computer chassis, the at least one expansion card comprising a fixed end fixed to the computer chassis and a free end, the fixing device comprising:

a position member defining at least one first slot in a sidewall thereof;

a fixing member comprising a fixing portion and a rotatable portion rotatably connected to the fixing portion, the fixing portion comprising a top surface, a bottom surface, a supporting surface connecting the top surface and the bottom surface, and a stopper portion extending from the supporting surface, a projection protruding from the top of the stopper portion, the rotatable portion further comprising a locking member, the locking member comprising a first hook on the top surface adjacent to the stopper portion and a second hook on the bottom surface away from the stopper portion, when the rotatable portion resists the stopper portion, the rotatable portion is latched by the first hook hooking the projection of the stopper portion; the rotatable portion further defining at least one second slot, wherein when the rotatable portion is rotated to a position where the at least one first slot faces the at least one second slot, the first and second slots are capable of engaging opposite sides of the free end of the at least one expansion card.

2. The fixing device as described in claim 1, further comprising a plurality of fasteners and a support member, wherein the support member comprises a frame and a plurality of through holes defined in a top of the frame, the position member and the fixing member both define a plurality of fixing holes corresponding to the through holes, the fasteners pass through the fixing holes and the corresponding through holes, to fix the position member and the fixing member to the frame.

3. The fixing device as described in claim 1, wherein the top surface and the bottom surface of the fixing portion both defines a receiving hole aligned with each other, two posts extend from the two opposite sides of the rotatable portion and respectively received in the receiving holes of the top surface and the bottom surface to allow the rotatable portion to rotate about the two posts relative to the fixing portion.

4. The fixing device as described in claim 1, wherein the locking member is flexible.

\* \* \* \* \*